US008941722B2

(12) United States Patent
Aronsson et al.

(10) Patent No.: US 8,941,722 B2

(45) Date of Patent: Jan. 27, 2015

(54) AUTOMATIC INTELLIGENT FOCUS CONTROL OF VIDEO

(75) Inventors: Pär-Anders Aronsson, Malmö (SE); David de Léon, Lund (SE); Håkan Jonsson, Hjärup (SE); Gunnar Klinghult, Lund (SE); Ola Thörn, Limhamn (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 491 days.

(21) Appl. No.: 13/342,875

(22) Filed: Jan. 3, 2012

(65) Prior Publication Data

US 2013/0169754 A1 Jul. 4, 2013

(51) Int. Cl.
*H04N 13/04* (2006.01)

(52) U.S. Cl.
USPC .......................................................... 348/46

(58) Field of Classification Search
None
See application file for complete search history.

(56) References Cited

U.S. PATENT DOCUMENTS

| | | | | |
|---|---|---|---|---|
| 2012/0044408 | A1 * | 2/2012 | Sasaki | 348/345 |
| 2013/0093788 | A1 * | 4/2013 | Liu et al. | 345/633 |
| 2013/0106674 | A1 * | 5/2013 | Wheeler et al. | 345/8 |
| 2013/0114850 | A1 * | 5/2013 | Publicover et al. | 382/103 |

* cited by examiner

*Primary Examiner* — William C Vaughn, Jr.
*Assistant Examiner* — Eileen Adams
(74) *Attorney, Agent, or Firm* — Sreenivas Vedantam; Moore & Van Allen PLLC

(57) ABSTRACT

The invention is directed to systems, methods and computer program products for providing focus control for an image-capturing device. An exemplary method includes capturing an image frame using an image-capturing device and recording video tracking data and gaze tracking data for one or more image frames following the captured image frame and/or for one or more images frames prior to the captured image frame. The exemplary method additionally includes calculating a focus distance and a depth of field based at least partially on the recorded video tracking data and recorded gaze tracking data. The exemplary method additionally includes displaying the captured image frame based on the calculated focus distance and the calculated depth of field.

18 Claims, 8 Drawing Sheets

When the user changes focus from from one object to another it is possible to make smooth transitions for both the focal distance and depth of field 100
Moving object 2
124
118
125
Gaze point 2
112
127
Focal distance 2
114
Moving object 1
117
Focal distance 1
110
Gaze point 1
120
115
Depth of field 2
126
Depth of field 1
116
When the user changes focus from from one object to another it is possible to make smooth transitions for both the focal distance and depth of field

AUTOMATIC INTELLIGENT FOCUS CONTROL OF VIDEO

BACKGROUND

When recording video with a video capturing device, a focus distance for the video is determined either manually or using an autofocus function at the moment when an image frame is captured or recorded by the video capturing device. The focus distance is the distance from video capturing device to an object in the scene, where a user of the image-capturing device desires that the object in the scene have a higher degree of sharpness when compared to other objects in the scene. Oftentimes, the quality of the recorded frame is less than satisfactory because of an imperfect focus distance. The imperfect focus distance may result from a delay period between changing the focus and recording the image frame. Additionally, the imperfect focus distance may result from restrictions in how fast the focus can be changed because of hardware restrictions associated with the video capturing device. Still additionally, the imperfect focus distance may result from the impossibility of knowing in advance what will happen in a scene to be captured, both at the time of capturing the scene and immediately after the time of capturing the scene. Therefore, what is needed is a video capturing device that provides better control over the focus distance when capturing an image frame using the video capturing device.

BRIEF SUMMARY

Embodiments of the invention are directed to systems, methods and computer program products for producing intelligent focus control for an image-capturing device. In some embodiments, an exemplary method includes capturing an image frame using an image-capturing device; recording video tracking data for one or more image frames following the captured image frame; recording gaze tracking data for the one or more image frames following the captured image frame; calculating a focus distance and a depth of field based at least partially on at least one of the recorded video tracking data and the recorded gaze tracking data; and displaying the captured image frame based at least partially on the calculated focus distance and the calculated depth of field.

In some embodiments, the method further includes recording video tracking data for one or more image frames prior to the captured image frame; recording gaze tracking data for the one or more image frames prior to the captured image frame; calculating a focus distance and a depth of field based at least partially on at least one of the recorded video tracking data for the one or more image frames following the captured image frame and the one or more image frames prior to the captured image frame, and the recorded gaze tracking data for the one or more image frames following the captured image frame and the one or more image frames prior to the captured image frame; and displaying the captured image frame based at least partially on the calculated focus distance and the calculated depth of field.

In some embodiments, the recording video tracking data step further comprises determining one or more moving objects based at least partially on the recorded video tracking data. In some embodiments, the recording video tracking data step further comprises determining a distance from the image-capturing device to the one or more moving objects in the captured image frame. In some embodiments, the distance to the one or more moving objects in the captured image frame is determined at a time after the capturing step.

In some embodiments, the recording gaze tracking data step further comprises determining movement of one or more focus areas based at least partially on the recorded gaze data.

In some embodiments, the method further comprises correlating the one or more moving objects with the movement of the one or more focus areas; and determining, based at least partially on the correlating step, one or more objects that the image-capturing device is focusing on or following.

In some embodiments, the method further comprises determining whether the image-capturing device focuses on a single object during a time frame that comprises the captured image frame and the one or more image frames following the captured image frame; and in response to determining the image-capturing device focuses on a single object during the time frame, calculating a focus distance and a depth of field associated with the single object.

In some embodiments, the method further comprises determining whether the image-capturing device shifts focus from a first object to a second object during a time frame that comprises the captured image frame and the one or more image frames following the captured image frame; and in response to determining the image-capturing device shifts focus from the first object to the second object, initiating transition from a first focus setting and a first depth of field setting associated with the first object to a second focus setting and a second depth of field setting associated with the second object.

In some embodiments, the image-capturing device is a lightfield image-capturing device. In some embodiments, the image-capturing device is a stereoscopic image capturing device. In some embodiments, the captured image frame and the one or more image frames following the captured image frame (and the one or more image frames prior to the captured image frame) comprise a video. In some embodiments, the image-capturing device is a portable mobile communication device. In some embodiments, an object as used herein is either a living thing or a non-living thing, where the object may be moving or non-moving during a period of time that includes the captured image frame and the and the one or more image frames following the captured image frame (and the one or more image frames prior to the captured image frame).

In some embodiments, the method further comprises allowing a user to manually adjust the calculated focus distance and the calculated depth of field either using the image-capturing device or using a separate computing device.

In some embodiments, the method further comprises recording video tracking data and gaze tracking data for the image frame while simultaneously capturing the image frame.

In some embodiments, the method further comprises enabling the image-capturing device to predict, to a predetermined degree of statistical confidence, an object's movement following the captured image frame based at least partially on the video tracking data recorded after the captured image frame, wherein the object is positioned in the captured image frame.

In some embodiments, the method further comprises determining whether a movement of the image-capturing device is an initiation of a change in focus of the image-capturing device or is a temporary movement of the image-capturing device based at least partially on the gaze tracking data recorded after the captured image frame; and in response to determining the movement of the image-capturing device is an initiation of a change in focus of the image-capturing device, initiating a change in focus of the image-capturing device.

In some embodiments, the method further comprises in response to determining the movement of the image-capturing device is a temporary movement, retaining a current focus of the image-capturing device.

In some embodiments, the image-capturing device determines a number (e.g., how many) of the one or more image frames following the captured image frame based at least partially on at least one of previously recorded video tracking data or previously recorded gaze tracking data.

Additionally, embodiments of the invention provide a computer program product for providing focus control for an image-capturing device. In some embodiments, the computer program product comprises a non-transitory computer readable medium comprising code configured to cause a computer to: record video tracking data for one or more image frames following the captured image frame; record gaze tracking data for the one or more image frames following the captured image frame; calculate a focus distance and a depth of field based at least partially on at least one of the recorded video tracking data and the recorded gaze tracking data; and display the captured image frame based at least partially on the calculated focus distance and the calculated depth of field.

Additionally, embodiments of the invention provide a system for providing focus control. In some embodiments, the system comprises an image-capturing component to capture an image frame. Additionally, the system comprises a processor to initiate: recording of video tracking data for one or more image frames following the captured image frame; recording of gaze tracking data for the one or more image frames following the captured image frame; calculation of a focus distance and a depth of field based at least partially on at least one of the recorded video tracking data and the recorded gaze tracking data; and display of the captured image frame based at least partially on the calculated focus distance and the calculated depth of field. Additionally, in some embodiments, the system provides a memory for storing recorded video tracking data and recorded gaze tracking data. Additionally, in some embodiments, the system comprises a display to display the captured image frame.

BRIEF DESCRIPTION OF THE DRAWINGS

Figure 1:
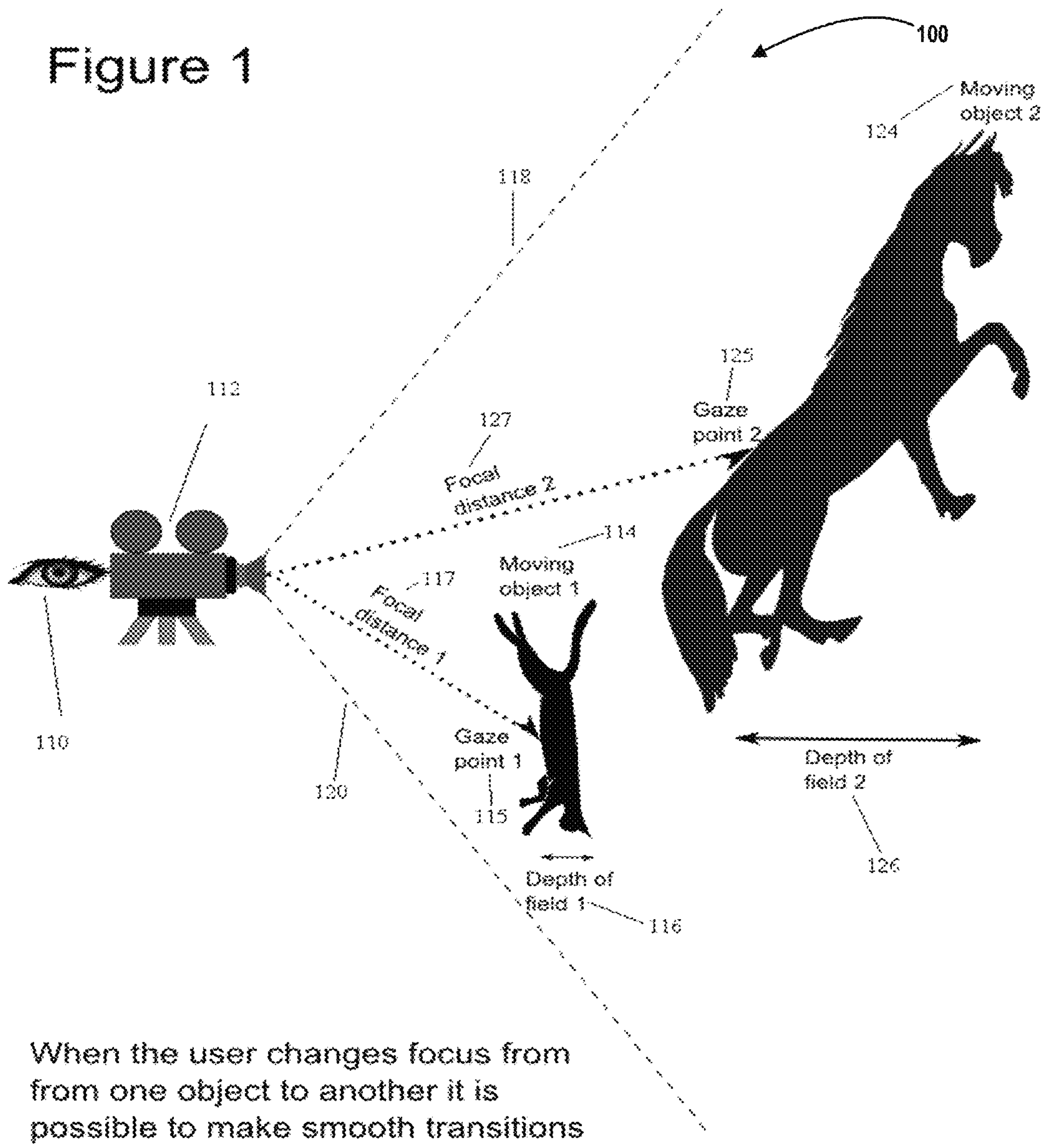
Figure 2:
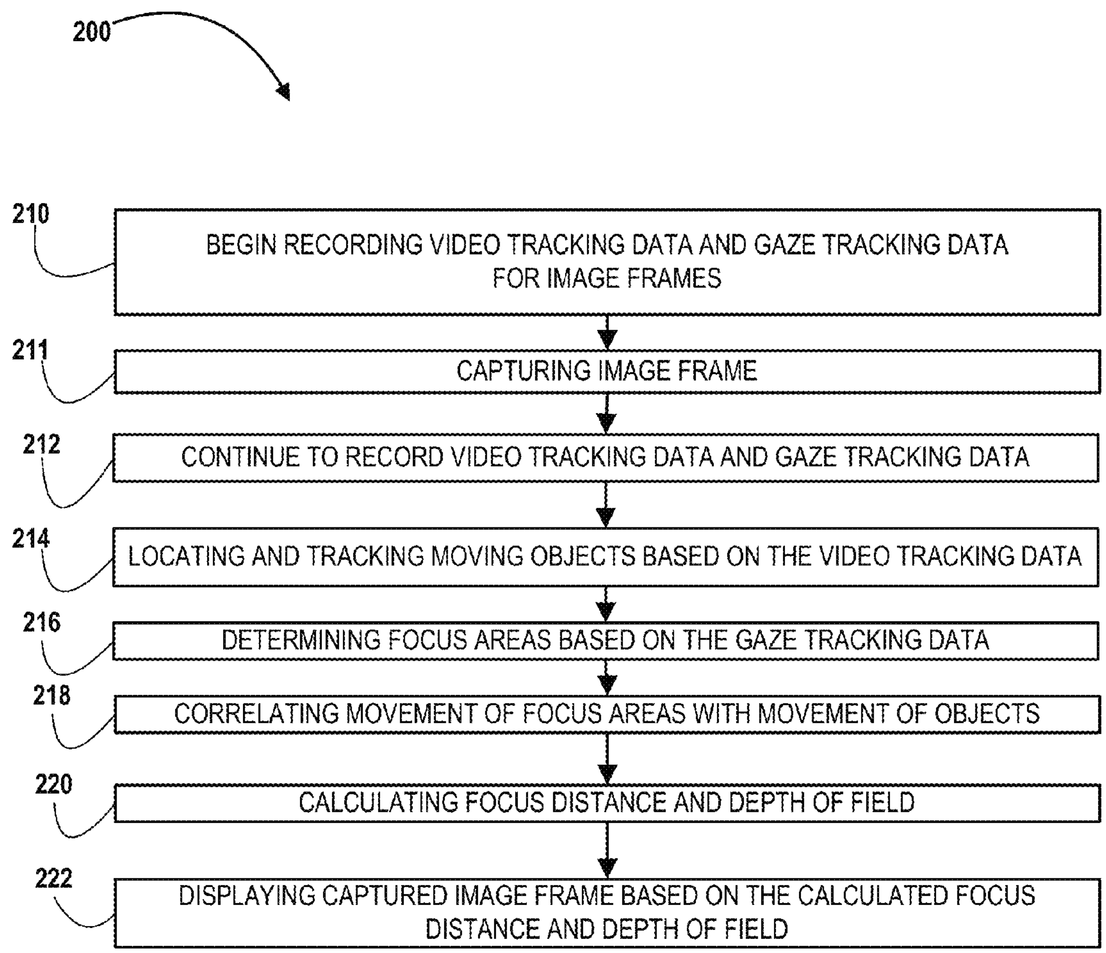
Figure 3:
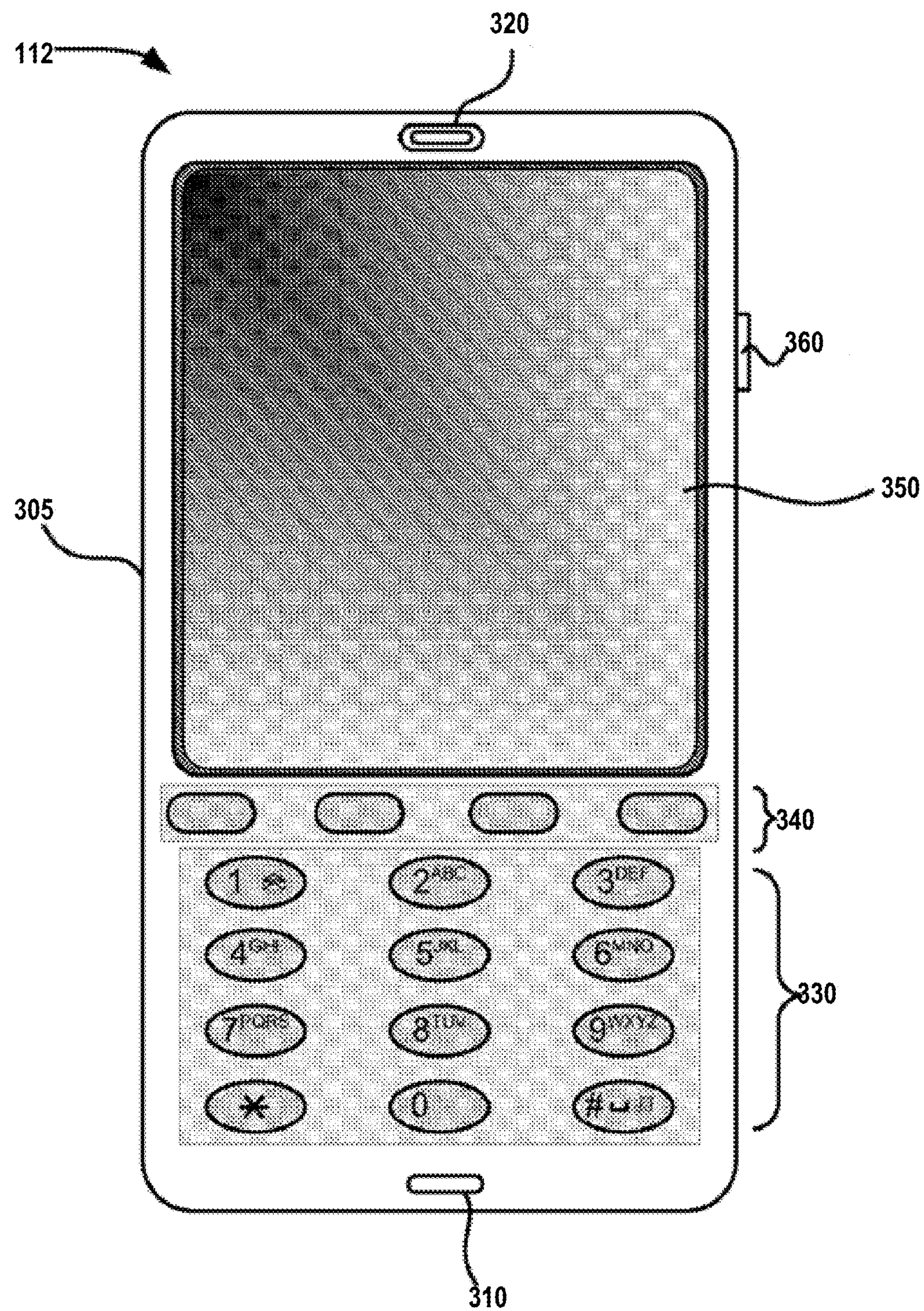
Figure 4:
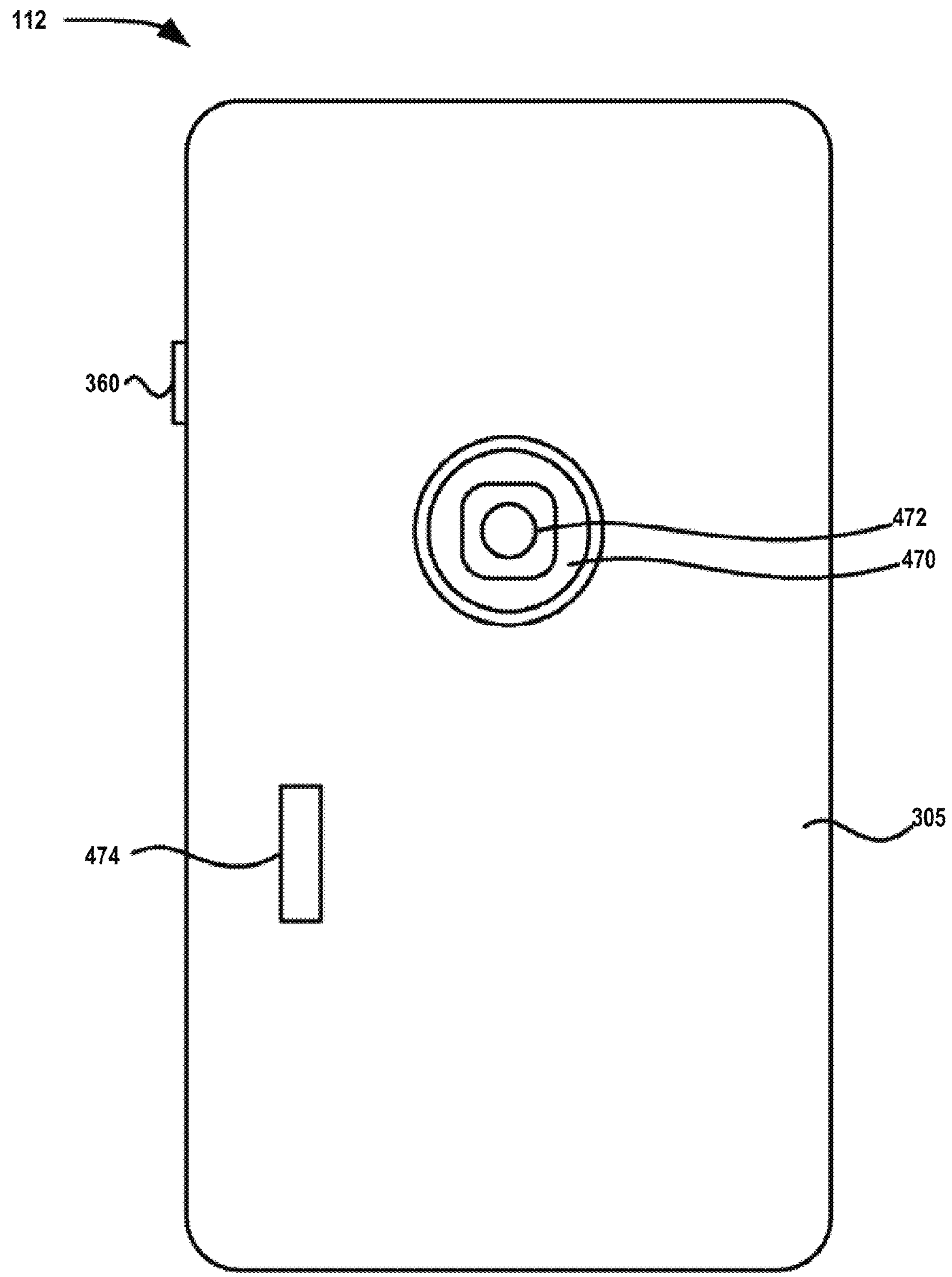
Figure 5:
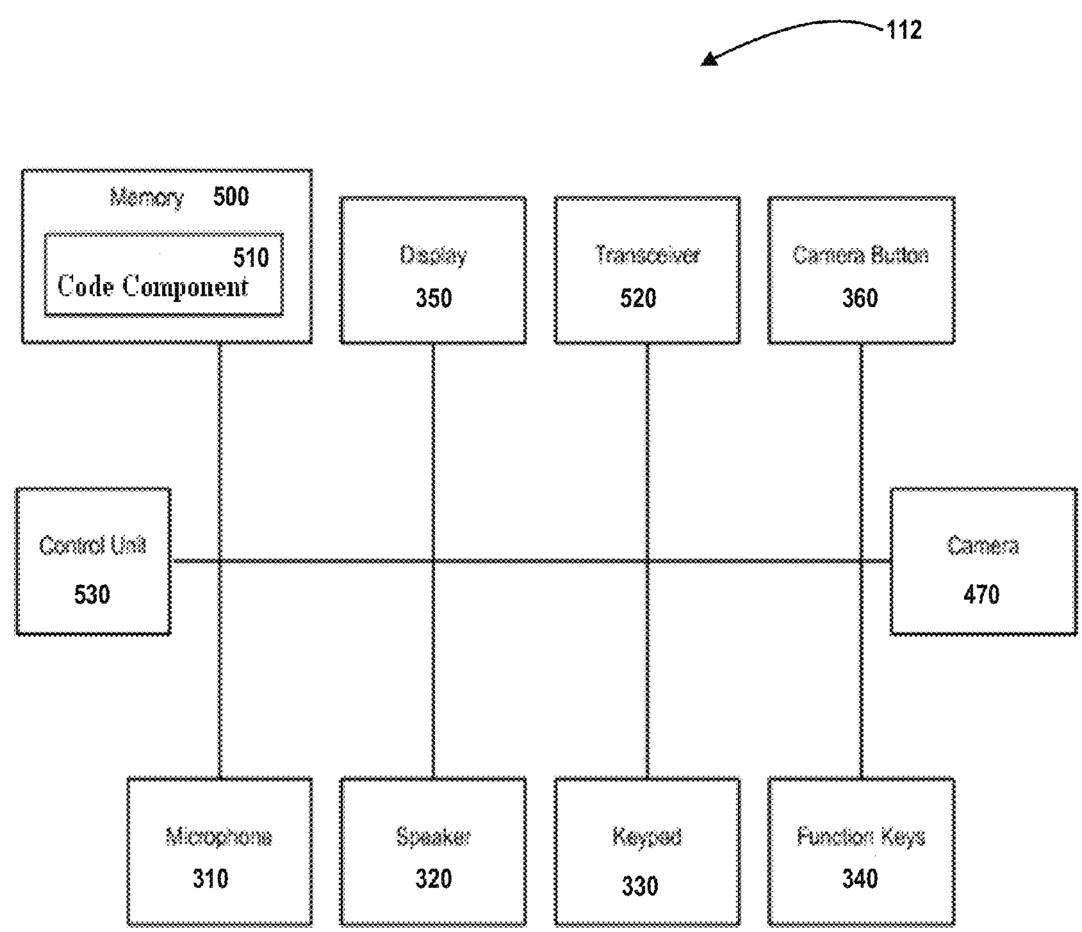
Figure 6:
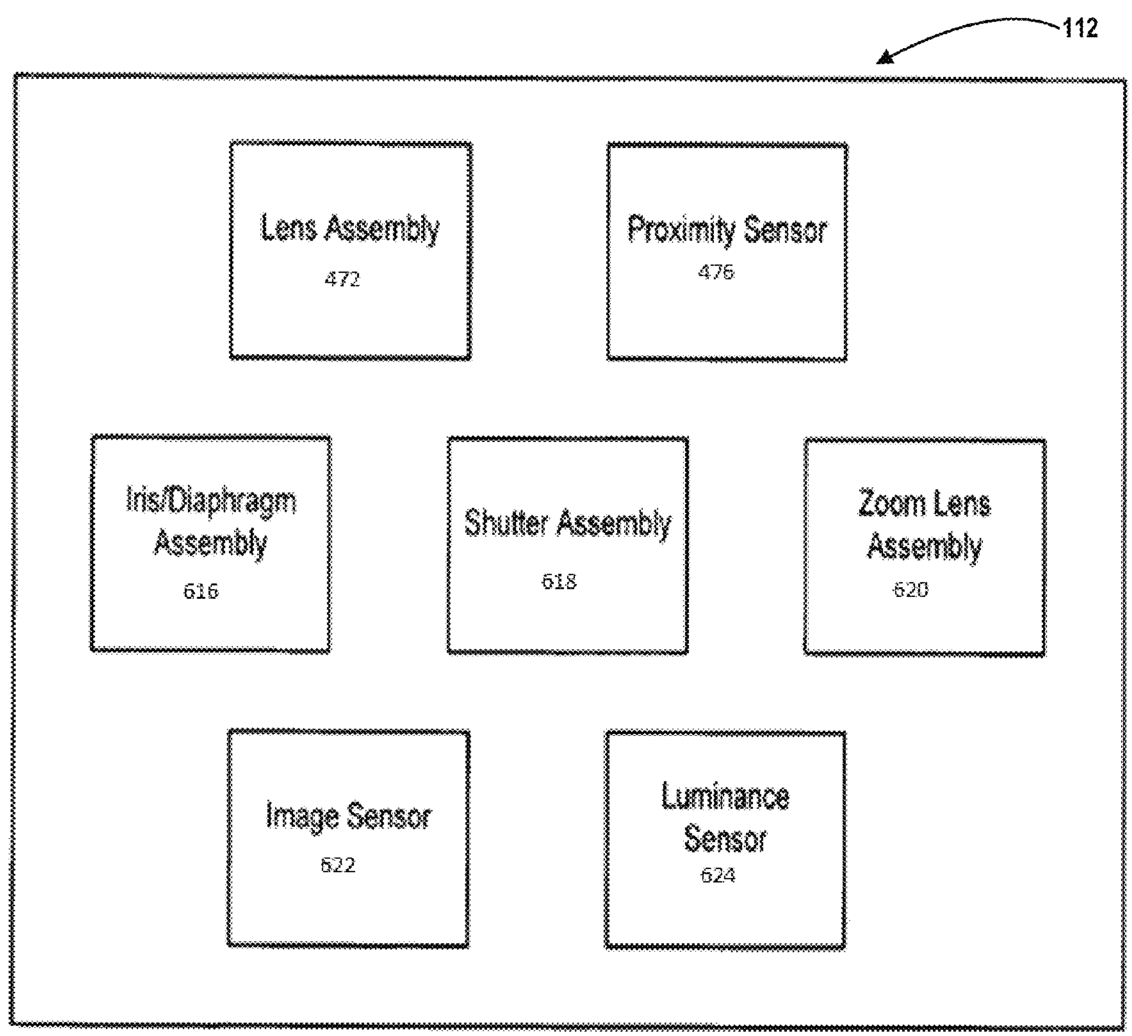
Figure 7:
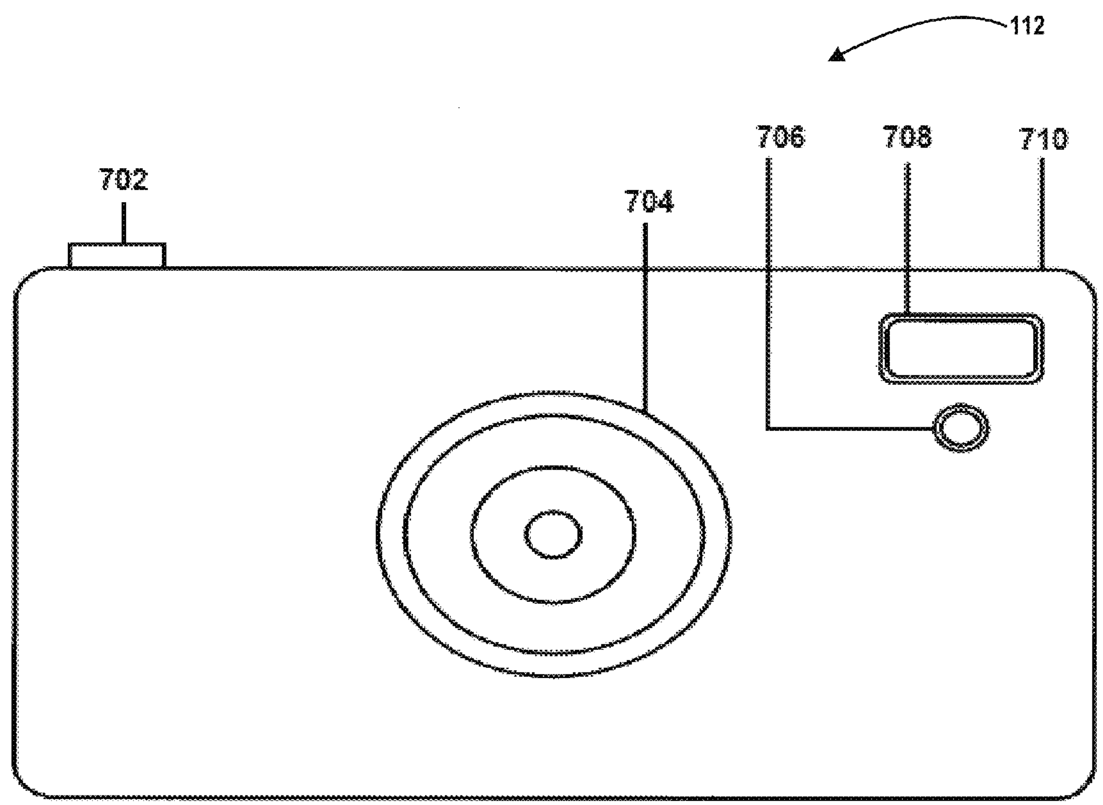
Figure 8:
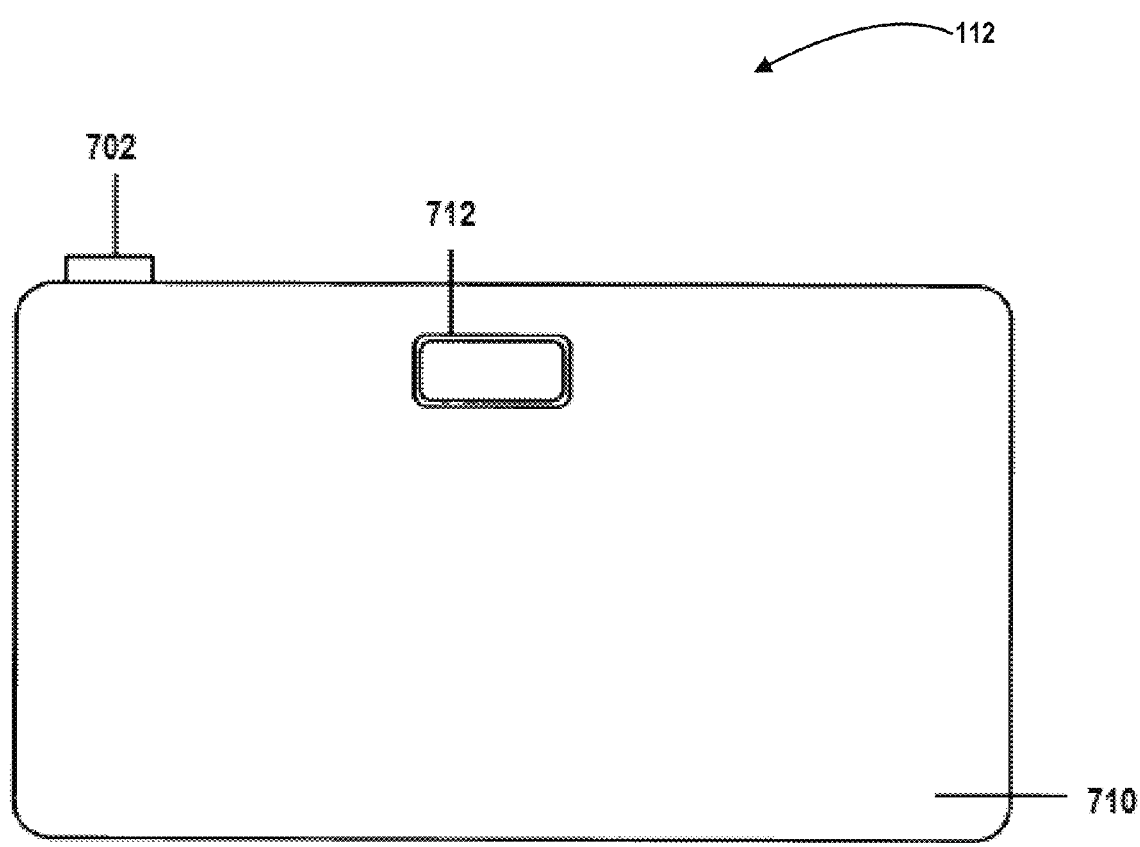

Having thus described embodiments of the invention in general terms, reference will now be made to the accompanying drawings, where:

FIG. 1 is a block diagram of an embodiment of a system environment for producing intelligent focus control for an image-capturing device;

FIG. 2 is a flowchart illustrating a general process flow for producing intelligent focus control for an image-capturing device, in accordance with embodiments of the present invention;

FIG. 3 is an exemplary image-capturing device, in accordance with embodiments of the present invention;

FIG. 4 is a diagram illustrating a rear view of exemplary external components of the image-capturing device depicted in FIG. 3, in accordance with embodiments of the present invention; and FIG. 5 is a diagram illustrating exemplary internal components of the image-capturing device depicted in FIG. 3, in accordance with embodiments of the present invention;

FIG. 6 is a diagram illustrating components of an exemplary camera depicted in FIG. 5, in accordance with embodiments of the present invention;

FIG. 7 is another exemplary image-capturing device, in accordance with embodiments of the present invention; and FIG. 8 is a diagram illustrating a rear view of exemplary external components of the image-capturing device depicted in FIG. 7, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for producing intelligent focus control for an image-capturing device. As used herein, an image frame may either be a still image frame that is captured at an instant of time or series of contiguous or continuous image frames that capture an event over a short or long duration (e.g., video). As used herein, "capturing an image frame" and "recording an image frame" are equivalent and are intended to be interchangeable. As used herein, an object or an object refers to a living or non-living thing in a scene that has been captured by an image-capturing device.

As used herein, a focus distance is the distance from the image-capturing device (e.g., a lens of the image-capturing device) to an object in a scene to be captured, where a user of the image-capturing device desires that the object in the scene have a higher degree of sharpness when compared to other objects in the scene. Therefore, when an image-capturing device captures the scene, a lens positioned in the image-capturing device may cause light to converge upon an image of the object in the captured image frame. When a lens associated with an image-capturing device focuses on an object at a distance, other objects at that distance may also have a similarly high degree of sharpness when captured by the image-capturing device. An object that is not at the same distance (either closer to or further away from the image-capturing device) as the object in focus does have the same degree of sharpness as the object that is in focus. As used herein, a zone of acceptable sharpness is referred to as the depth of field. Increasing the depth of field increases the sharpness of an image because the zone of acceptable sharpness becomes bigger. This means objects that are positioned within a larger range of depths will have a higher degree of sharpness when captured by the image-capturing device. Conversely, decreasing the depth of field decreases the sharpness of an image. In some embodiments, an aperture size of the image-capturing device may be reduced in order to increase the depth of field, and conversely an aperture size of the image-capturing device may be increased in order to reduce the depth of field.

As used herein, focus control is the process of controlling a focus function associated with an image-capturing device when capturing a series of image frames over a period of time. In some embodiments, focus control is the process of maintaining the focus of the lens associated with the image-capturing device on a single object as it moves from one position in the scene to another position in the scene. As a further example, in other embodiments, focus control is the process of shifting the focus from one object in the scene to another object in the scene. The process of shifting the focus from one object to another object may occur either before an image frame of the scene is captured or may occur during the capturing of multiple image frames of a scene. Embodiments of the invention are directed to providing a smooth shift in focus from one object to another object when capturing video or a series of image frames of a scene.

As used herein, one or more attributes are used to describe the type of focus control associated with a moving object that is captured in a series of image frames. Additionally, as used herein, the same attributes may be used to describe the type of focus control associated with changing the focus from one object another object during a series of image frames. Focus control is "smooth" when during the display of a series of captured images, there are no appreciable jerks in the transition of the focus from one object to another object, and/or no appreciable jerks in the transition of the focus when an object in focus moves closer to or further away from the image-capturing device. Focus control is "accurate" when a user configures the image-capturing device to focus on a particular object or a particular feature of an object (e.g., face of an object), and in response to the user's configuration, the image-capturing device actually focuses on the particular object or the particular feature of the object. Focus control is "timely" when the image-capturing device can change the focus settings quickly enough when a moving object changes its position with respect to the image-capturing device or when a user of the image-capturing device (or the image-capturing device itself) shifts the focus of the image-capturing device from a first moving object to a second moving object (e.g., See FIG. 1).

In embodiments of the invention, a type of image-capturing device that is used may be a lightfield image-capturing device. As used herein, a lightfield image-capturing device may also be referred to as a plenoptic image-capturing device. A lightfield image-capturing device may use a microlens array to capture lightfield information for a scene to be captured by the lightfield image-capturing device. As used herein, a microlens is a small lens, usually with a diameter that is less than 1 mm. This invention is not limited to microlenses associated with any particular diameter. As used herein, a microlens array includes one or more microlenses that are formed in a one-dimensional or two-dimensional array on a substrate. As used herein, lightfield information includes information regarding the light present in the scene to be captured. This information includes an amount of light associated with a point in the scene to be captured, direction and/or intensity of light rays associated with a point in the scene to be captured, etc. In embodiments of the invention, a lightfield image-capturing device may be used to capture an image frame. In embodiments of the invention, the lightfield image-capturing device retrieves a distance associated with one or more pixels of an image frame, either before, at the point of, or after the capture of the image frame. In embodiments of the invention, a lightfield image-capturing device makes it possible to determine, after capturing the image (e.g., during post-processing of a captured image frame), a focus distance and a depth of field (and/or a field of view) to use when displaying the captured image frame on a display located in the lightfield image-capturing device or in a remote display located remotely from the lightfield remote capturing device. The focus distance, the depth of field, and the field of view may be referred to as cameras settings.

Video tracking is the process of locating and tracking moving objects over time in a sequence or series of image frames. This video tracking process is executed by an image-capturing device described herein. In embodiments of the invention, the video tracking process uses distance information (e.g., distance from the image-capturing device to a pixel in an image frame) obtained from the image-capturing device (e.g., a lightfield image-capturing device) in order to increase the reliability and accuracy of the video tracking process. In some embodiments of the invention, video tracking data refers to data associated with one or more objects that move their position during a series of image frames, where each image frame is captured at a different point in time. Additionally or alternatively, video tracking data may also refer to data associated with one or more objects that do not move their position during a series of image frames, where each image frame is captured at a different point in time.

Gaze tracking is the process of tracking the point of gaze (what an eye or an image-capturing device is looking at) over a period of time. This gaze tracking process is executed by an image-capturing device described herein. Gaze tracking data or gaze data refers to data regarding one or more points (or areas) in the image frame that the lens of the image-capturing device is pointing towards or focusing upon.

Embodiments of the invention are directed to using a lightfield image-capturing device, video tracking data, and gaze tracking data to create smooth, accurate, and timely focusing when capturing an image frame or a series of image frames. The smooth, accurate, and timely focusing is based on an automatic determination of a focus distance and a depth of field (and a field of view) to use when displaying an image frame that was captured at a point in time prior to displaying the image. The automatic determination of the focus distance and the depth of field (and the field of view) is based at least partially on the above-described video tracking data and gaze tracking data.

A lightfield image-capturing device as used herein may be constructed in a number of different ways. For example, in some embodiments, the lightfield image-capturing device may comprise one or more image-capturing devices, wherein each image-capturing device comprises at least one lens and at least one sensor. In other embodiments, the lightfield image-capturing device may comprise one or more image-capturing devices, wherein each image-capturing device comprises a single lens along with a plurality of sensors. In still other embodiments, the lightfield image-capturing device may comprise one or more image-capturing devices, wherein each image-capturing device comprises a single sensor along with a plurality of lenses.

In some embodiments, an image-capturing device (e.g., a lightfield image capturing device) as described herein also has stereoscopic capability. In some embodiments of the stereoscopic image-capturing device, the stereoscopic image-capturing device comprises two or more lightfield image-capturing devices. The stereoscopic image-capturing device simulates human binocular vision and enables capture of three-dimensional images or a continuous stream of three-dimensional images. Embodiments of an image-capturing device are not limited to the features described herein.

As explained previously, embodiments of the invention are directed to methods, systems, and computer program products for generating or choosing a depth of field and a focus distance (and a field of view) that are used when displaying a captured image frame. In order to generate or choose a depth of field and a focus distance (and a field of view), an image-capturing device according to the present invention simultaneously captures one or more image frames from the lightfield image-capturing device, and records gaze tracking data and video tracking data associated with the one or more image frames.

When capturing video, i.e., a series of image frames, an image-capturing device is configured to record video tracking and gaze tracking data associated with the current image frame and one or more previous image frames. The captured video may be generated and displayed in real-time while the video is captured by the image-capturing device. However, in order to produce smooth, accurate, and timely focusing, and thereby achieve better focus control in embodiments of the invention, the process of generating and displaying the captured video may be delayed by a few seconds. Therefore, while an image-capturing device simultaneously captures and displays video, the displayed video trails the captured video by a few seconds. By delaying the generation and display of the captured video, the image-capturing device generates video tracking data for a few extra seconds. These few extra seconds of video tracking data permit the image-capturing device to make a better determination or prediction of an object's movements. Embodiments of the invention are not limited to any particular delay time between the capturing and display of the video of a scene. Therefore, in embodiments of the invention, the displayed video may trail the captured video by a time frame that is smaller than a few seconds (e.g., on the order of milliseconds, microseconds, nanoseconds, or picoseconds). In some embodiments of the invention, the process of generating and displaying the captured video may occur after the video is recorded, i.e., no simultaneous capturing and displaying of the video.

In some embodiments, an image-capturing device described herein may gather or determine gaze tracking data and/or video tracking data for the current frame that is captured and may additionally gather or determine gaze tracking data and/or video tracking data for image frames that are captured following the current frame. The image frames that are captured following the current frame may comprise the few extra seconds of video as described earlier. In some embodiments, the image-capturing may automatically determine the duration of the extra seconds of video (or the number of image frames) for which video tracking data and gaze tracking data is determined. In some embodiments, this duration may depend on the video tracking data and/or the gaze tracking data associated with image frames captured prior to the current image frame. Alternatively, this duration may depend on the number of objects in the scene along with the movement of the number of objects in the scene. In some embodiments, this duration may depend on other attributes associated with the video tracking data and/or the gaze tracking data associated with the captured image frame or associated with image frames captured prior to the current image frame. In other embodiments, the image-capturing device may allow a user of the image-capturing device to choose the duration of the extra seconds of video (following the current captured frame) for which the image-capturing device determines video tracking data and/or gaze tracking data.

Additionally or alternatively, in some embodiments, an image-capturing device described herein may gather or determine gaze tracking data and/or video tracking data for the current frame that is captured and may additionally gather or determine gaze tracking data and/or video tracking data for image frames that are captured prior to the current frame. The image frames that are captured prior to the current frame may comprise few more seconds of video. In some embodiments, the image-capturing device may automatically determine the duration (or the number of image frames) of the extra seconds of video (either prior to or following the current captured frame) for which video tracking data and gaze tracking data is determined. For example, in some embodiments, this duration (or the number of image frames) may depend on the number of objects in the scene along with the movement of the number of objects in the scene. In some embodiments, this duration (or the number of image frames) may be based at least partially on previously recorded video tracking data and/or previously recorded gaze tracking data. In other embodiments, the image-capturing device may allow a user of the image-capturing device to choose the duration of the extra seconds of video (prior to the current captured frame) for which the image-capturing device determines video tracking data and/or gaze tracking data.

In embodiments of the invention, the image-capturing device uses gaze tracking data to find or determine areas within an image frame where the image-capturing device has focused on for more than a pre-determined period of time during the capturing of video of a scene. In some embodiments, the image-capturing device may use statistical algorithms to find or determine these focus areas. The image-capturing device may also use the gaze tracking data to determine how these areas of focus change over time during the capturing of the video. By delaying the generation and display of the captured video by a few seconds, the image-capturing device generates gaze tracking data for a few extra seconds. These few extra seconds of gaze data allow the image-capturing device to determine how the areas of focus change or move during those few extra seconds. For example, the image-capturing device may be able to determine whether a saccade is the start of a change in focus of the image-capturing device or is a temporary movement. As used herein, a saccade is a rapid, jerky movement of the image-capturing device. In response to determining the movement of the image-capturing device is an intended initiation of a change in focus of the image-capturing device, the image-capturing device initiates a change in focus settings (e.g., focus distance, focus direction, etc.). In response to determining the movement of the image-capturing device is an unintended temporary movement, the image-capturing device retains current focus settings (e.g., focus distance, focus direction, etc.) and does not initiate change of focus settings.

Subsequently, the image-capturing device may correlate the gaze tracking data (movement of focus areas over a period of time) with the video tracking data (movement of objects over a period of time). The image-capturing device may use one or more statistical algorithms to determine, within a predetermined degree of statistical confidence, whether the user of the image-capturing device is following or focusing upon a specific object during a predetermined period of time, or whether the user is following or focusing upon a plurality of objects, which may be situated at different distances from the image-capturing device, in the scene during a predetermined period of time. When the image-capturing device determines a single object that is being followed by the user of the image-capturing device during the pre-determined period of time, the image-capturing device may use distance information associated with the object being followed to determine a focus distance and a depth of field for displaying the captured image. As explained previously, an image-capturing device (e.g., a lightfield image-capturing device) described herein either stores or instantaneously generates a distance associated with a pixel of an image frame, where the image frame has either already been captured or is yet to be captured. Also as explained previously, an image-capturing device can determine, during post-processing, the distance associated with a pixel of an image frame that has already been captured.

After automatically determining the focus distance and the depth of field, the image-capturing device processes (e.g., alters) the captured image based at least on the determined focus distance and/or the determined depth of field. Subsequently, the image-capturing device displays this processed image on a display associated with the image-capturing device or on a display that is located remotely from the image-capturing device. In some embodiments where the display is located remotely from the image-capturing device, the image-capturing device may transmit the processed image using one or more wired or wireless transmission mechanisms to a remote computing device that is associated with the remote display. In alternate embodiments, the image-capturing device may transmit the captured image along with the raw data collected and/or generated by the image-capturing device to the remote computing device. The remote computing device may generate the image to be displayed on the remote display using both the captured image and the raw data. In some embodiments, the raw data may include the above-described distance information associated with one or more pixels of an image frame generated by the image-capturing device, the above-described video tracking data, the above-described gaze tracking data, etc. In some embodiments, the raw data may be processed by the image-capturing device before being transmitted to the remote computing device. For example, the raw data may be processed by the image-capturing device to determine a focus distance and depth of field (and field of view). In such embodiments, the image-capturing device transmits the captured image along with the determined focus distance and depth of field (and field of view) to the remote computing device.

In some embodiments, after automatically determining the focus distance and a depth of field, the image-capturing device may prompt a user to manually adjust the automatically determined focus distance and depth of field. In such embodiments, a user of the image-capturing device may adjust the automatically determined focus distance and depth of field (and field of view) if the user chooses to do so prior to displaying an image frame that is captured by the image-capturing device. In some embodiments, a user of the image-capturing may store the user's adjustments to the focus distance and depth of field (and field of view) prior to even capturing an image using the image-capturing device. In such embodiments, after automatically determining the focus distance and depth of field (and field of view), the image-capturing device may automatically adjust the determined focus distance and depth of field using the user's previously stored adjustments to the focus distance and depth of field (and field of view).

In some embodiments, a user may perform the manual adjustment of the automatically determined focus distance and depth field either using the same image-capturing device that is used to capture the video or using a computing device (e.g., a general purpose computer) separate from the device that is used to capture the video. Therefore, in some embodiments, the prompting of the user to manually adjust the determined focus distance and depth of field may occur on a computing device separate from the image-capturing device. Therefore, while the image-capturing device is capturing video, the user may manually adjust the determined focus distance and depth of field using the separate computing device. In such embodiments, the display of the captured video that is modified based on the manually adjusted setting may occur on the image-capturing device and/or on the separate computing device.

Referring now to FIG. 1, an exemplary system environment 100 is provided for producing intelligent focus control for an image-capturing device, in accordance with embodiments of the present invention. As explained previously, embodiments of the invention are directed to providing focus control when an image-capturing device is following a single object, which may change its distance over a period of time when the image-capturing device is following the single object. Additionally, as explained previously, embodiments of the invention are directed to providing focus control when an image-capturing device changes the focus of an image-capturing device from a first object to a second object, where the first object and the second object may be situated at different distances from the image-capturing devices. Additionally, the first object may have a different depth of field when compared to the second object.

In the system environment 100 presented in FIG. 1, a user 110 of the image-capturing device 112 moves the device 112 such that the focus of the device 112 shifts from moving object 1 114 to moving object 2 124. Embodiments of the invention provide a smooth transition of focus from moving object 1 114 to moving object 2 124. FIG. 1 also shows the boundaries 118 and 120 of the scene that is capturable by the image-capturing device 112. In some embodiments, the boundaries 118 and 120 comprise the field of view of the image-capturing device 112.

At $t_0$, the image-capturing device 112 is focusing on or following moving object 1 114. Based on the above-described embodiments of the invention, the displaying of a captured image frame of moving object 1 114 is delayed by a few seconds following the capturing of the image frame. By delaying the display of the captured image frame of moving object 1 114, the image-capturing device 112 can produce more accurate, smooth, and timely focusing of the moving object 1 114 while the moving object 1 114 is in motion and constantly changing its distance from (and position with respect to) the image-capturing device 112. Additionally, by delaying the display of the captured image frame of moving object 1 114, the image-capturing device 112 can produce smoother transitions for both the focal distance 1 117 and depth of field 1 116 (and field of view) as the moving object 1 114 constantly changes its distance from the image-capturing device 112. When displaying the captured image frame of moving object 1 114, the image-capturing device 112 uses the focal distance 1 117 and the depth of field 1 116. As explained previously, the focal distance 1 117 and the depth of field 1 116 are determined by the image-capturing device 112 based at least partially on gaze tracking data, and/or video tracking data, and/or distance information associated with pixels of an image frame (that captures moving object 1 114) that has either already been captured or that is yet to be captured. The gaze data may include information regarding gaze point 1 115.

At a point in time following $t_0$, i.e., at $t_1$, a user of the image-capturing device shifts the focus of the image-capturing device to moving object 2 124. Based on the above-described embodiments of the invention, the displaying of a captured image frame of moving object 2 124 is delayed by a few seconds following the capturing of the image frame. By delaying the display of the captured image frame of moving object 2 124, the image-capturing device 112 can produce more accurate, smooth, and timely focusing of the moving object 2 124 when a user 110 of the image-capturing device 112 changes the focus of the image-capturing device 112 from moving object 1 114 to moving object 2 124. Additionally, by delaying the display of the captured image frame of moving object 2 124, the image-capturing device 112 can produce smoother transitions for both the focal distance 1 117 and depth of field 1 116 when a user 110 of the image-capturing device 112 changes the focus of the image-capturing device 112 from moving object 1 114 to moving object 2 124. When displaying the captured image frame of moving object 2 124, the image-capturing device 112 uses the focal distance 2 127 and the depth of field 2 126. As explained previously, the focal distance 2 127 and the depth of field 2 126 are determined by the image-capturing device 112 based at least partially on gaze data, and/or video tracking data, and/or distance information associated with pixels of an image frame (that captures moving object 2 124) that has either already been captured or that is yet to be captured. The gaze data may include information regarding gaze point 2 125.

Referring now to FIG. 2, a general process flow 200 is provided for producing intelligent focus control for an image-capturing device, in accordance with embodiments of the present invention. At block 210, the image-capturing device begins to record video tracking data and gaze tracking data for one or more image frames. This recorded video tracking data and gaze tracking data may be stored in either a temporary or permanent memory associated with the image-capturing device. Additionally, the image-capturing device may record distance information associated with one or more pixels of a captured frame. In alternate embodiments, the image-capturing device may retrieve distance information associated with one or more pixels of a captured frame without recording or storing distance information associated with the one or more pixels of the captured frame. Instead, the image-capturing device (e.g., a lightfield image-capturing device) enables retrieval of a distance associated with one or more pixels of a captured frame using a post-processing algorithm.

At block 211, the image-capturing device captures an image frame of a scene.

At block 212, the image-capturing device gathers or determines video tracking data and gaze tracking data for one or more image frames that are captured prior to the current image frame and for one or more image frames that are captured following the current image frame (i.e., the one or more image frames that are captured during the predetermined time period preceding the display of the current image frame). Additionally, in some embodiments, the image-capturing device gathers distance data associated with the one or more image frames that are captured prior to the current image frame and the one or more image frames that are captured following the current image frame.

At block 214, using the video tracking data (and/or the gaze tracking data), the image-capturing device locates and tracks, or determines, moving objects in the one or more image frames that are captured both prior to and following the current image frame. Additionally, the image-capturing device may use distance information associated with pixels of the one or more captured image frames to more accurately track and locate the moving objects in the one or more captured frames that are under consideration. By using the distance information associated with pixels of the one or more captured image frames, the process of focus control as described herein becomes more accurate.

At block 216, using the gaze tracking data, the image-capturing device determines areas within the one or more image frames that the image-capturing device (or the user of the image-capturing device) is focusing on or following. Additionally, using the gaze tracking data, the image-capturing device may determine areas within the one or more image frames that image-capturing device is not focusing on. In order to determine the areas that the image-capturing device is focusing on and the areas that the image-capturing is not focusing on, the image-capturing device may use one or more statistical algorithms. For example, in some embodiments, the image-capturing device may determine that the image-capturing device is focusing on an area if the image-capturing points towards the area and captures the area for a period of time that is greater than a pre-determined threshold period of time. In some embodiments, after determining or identifying one or more focus areas, the image-capturing device determines how these focus areas change with time.

At block 218, the image-capturing device correlates the movement of the focus areas from block 216 with the movement of objects in the scene from block 214. In this block, the image-capturing device determines the objects in the scene that is user of the image-capturing device is interested in and desires to follow. Therefore, while at block 214, the image-capturing device locates and tracks moving objects in the scene, at block 218, the image-capturing device determines whose of those moving objects are located in or associated with focus areas determined at block 216.

At block 220, over the time frame covered by the image frames that are considered prior to the current captured image frame and the image frames that are considered following the current captured image frame (block 212), the image-capturing device may determine whether the image-capturing device (or whether a user of the image-capturing device) continues to follow or focus on a single object or whether image-capturing device changes its focus to another object. In some embodiments, the image-capturing device makes this determination for the time period (i.e., the image frames) following the current captured image frame, and not for the time period (i.e., the image frames) prior to the current captured image frame. The image-capturing device may make this determination based on the correlation process executed at block 218.

If the image-capturing device determines at block 220 that the image-capturing device continues to follow or focus on a single object during the time frame set by block 212, then the image-capturing device sets a focus distance as a distance of the single object in the current captured image frame. Additionally or alternatively, in some embodiments, this focus distance is calculated based at least partially on one of the previously determined distance data, video tracking data, and gaze tracking data (blocks 210 and 212). Additionally, the image-capturing device calculates a depth of field (and field of view) for the single object as well. In some embodiments, this depth of field (and field of view) is calculated based at least partially on one of the previously determined distance data, video tracking data, and gaze tracking data (blocks 210 and 212). Additionally, by delaying the display of the single moving object after the capturing of the single moving object, the image-capturing device adjusts the focus distance (and sometimes the depth of field and/or field of view) of the single moving object in a smooth manner such that a viewer of the display does not view any appreciable jerky transition of the focus distance (and sometimes the depth of field and/or field of view).

If the image-capturing device determines at block 220 that the image-capturing device changes its focus from a first moving object to a second moving object during the time frame set by block 212, then the image-capturing enables smooth transition of focus and depth of field (and field of view) settings associated with the first moving object to focus and depth of field (and field of view) settings associated with the second moving object such that a viewer of the display does not view any appreciable jerky transition of the focus distance and the depth of field. Therefore, the image-capturing device calculates the focus distance for the second moving object. In some embodiments, the focus distance for the second moving object is calculated based at least partially on one of the previously determined distance data, video tracking data, and gaze tracking data (blocks 210 and 212). Additionally, the image-capturing device calculates a depth of field (and field of view) for the second moving object as well. In some embodiments, the this depth of field (and field of view) is calculated based at least partially on one of the previously determined distance data, video tracking data, and gaze tracking data (blocks 210 and 212).

In some embodiments, in addition to the focus distance, depth of field, and field of view calculations, the image-capturing device may need to make additional determinations. For example, in displaying the captured image frame, the image-capturing device may need to use the exposure settings that were used when capturing the image frame. The exposure settings that were determined by the image-capturing device depended on the amount of available light when capturing the image frame. The exposure settings may include information regarding the aperture settings when the image was captured.

In some embodiments, the focus distance (or the depth of field or the field of view) calculation may be based on additional factors associated with the image-capturing device. For example, these factors may include the size, the number of pixels, the size of the pixels, and the light-sensitivity of an image sensor associated with the image-capturing device. The image sensor may provide a certain degree of resolution and clarity for a captured image frame.

At block 222, when displaying the captured frame a predetermined time period after capturing the frame, a display associated with the image-capturing device displays the captured image frame based on a calculated focus distance and/or depth of field and/or field of view.

Additionally, in some embodiments, the image-capturing device enables smooth transition of the field of view when the focus of the image-capturing device shifts from a first moving object to a second moving object such that a viewer of the display does not view any appreciable jerky transition of the field of view. In some embodiments, the field of view is the scene that immediately surrounds a moving object. In other embodiments, the field of view is the entire scene that is captured by an image-capturing device. In some embodiments, the field of view changes substantially when the image-capturing device shifts the focus of the image-capturing device from a first moving object to a second moving object. In other embodiments, the field of view does not change substantially when the image-capturing device shifts the focus of the image-capturing device from a first moving object to a second moving object.

At block 222, the image-capturing device displays the captured current image frame. In some embodiments, this captured image frame is part of a stream of image frames (i.e., video). As explained previously, this captured image frame is displayed a predetermined time period after the capture of the image frame.

In some embodiments, each step presented in FIG. 2 may serve as a triggering event for the next step. However, the steps of the method presented in FIG. 2 may be performed in an order different from that presented in FIG. 2.

Referring now to FIG. 3, FIG. 3 is a diagram illustrating a front view of external components of an exemplary image-capturing device. As illustrated in FIG. 3, image-capturing device 112 may include a housing 305, a microphone 310, a speaker 320, a keypad 330, function keys 340, a display 350, and a camera button 360.

Housing 305 may include a structure configured to contain or at least partially contain components of image-capturing device 112. For example, housing 305 may be formed from plastic, metal or other natural or synthetic materials or combination(s) of materials and may be configured to support microphone 310, speaker 320, keypad 330, function keys 340, display 350, and camera button 360.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music through speaker 320.

Keypad 330 may include any component capable of providing input to device 112. Keypad 330 may include a standard telephone keypad. Keypad 330 may also include one or more special purpose keys. In one implementation, each key of keypad 330 may be, for example, a pushbutton. Keypad 330 may also include a touch screen. A user may utilize keypad 330 for entering information, such as text or a phone number, or activating a special function.

Function keys 340 may include any component capable of providing input to image-capturing device 112. Function keys 340 may include a key that permits a user to cause image-capturing device 112 to perform one or more operations. The functionality associated with a key of function keys 340 may change depending on the mode of image-capturing device 112. For example, function keys 340 may perform a variety of operations, such as placing a telephone call, playing various media, setting various camera features (e.g., focus, zoom, etc.) or accessing an application. Function keys 340 may include a key that provides a cursor function and a select function. In one implementation, each key of function keys 340 may be, for example, a pushbutton.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. Camera button 360 may be a pushbutton that enables a user to take an image.

Since image-capturing device 112 illustrated in FIG. 3 is exemplary in nature, image-capturing device 112 is intended to be broadly interpreted to include any type of electronic device that includes an image-capturing component. For example, image-capturing device 112 may include a wireless phone, a personal digital assistant (PDA), a portable computer, a camera, or a wrist watch. In other instances, image-capturing device 112 may include, for example, security devices or military devices. Accordingly, although FIG. 3 illustrates exemplary external components of image-capturing device 112, in other implementations, image-capturing device 112 may contain fewer, different, or additional external components than the external components depicted in FIG. 3. Additionally, or alternatively, one or more external components of image-capturing device 112 may include the capabilities of one or more other external components of image-capturing device 112. For example, display 350 may be an input component (e.g., a touch screen). Additionally, or alternatively, the external components may be arranged differently than the external components depicted in FIG. 3.

Referring now to FIG. 4, FIG. 4 is a diagram illustrating a rear view of external components of the exemplary image-capturing device. As illustrated, in addition to the components previously described, image-capturing device 112 may include a camera 470, a lens assembly 472, a proximity sensor 476, and a flash 474.

Camera 470 may include any component capable of capturing an image. Camera 470 may be a digital camera. Display 350 may operate as a view finder when a user of image-capturing device 112 operates camera 470. Camera 470 may provide for automatic and/or manual adjustment of a camera setting. In one implementation, image-capturing device 112 may include camera software that is displayable on display 350 to allow a user to adjust a camera setting. For example, a user may be able adjust a camera setting by operating function keys 340.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 (not shown in FIG. 4) may include any component capable of collecting and providing distance information that may be used to enable camera 470 to capture an image properly. For example, proximity sensor 476 may include an infrared (IR) proximity sensor that allows camera 470 to compute the distance to an object, such as a human face, based on, for example, reflected IR strength, modulated IR, or triangulation. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving objects, which may or may not be in focus, either prior to, during, or after capturing of an image frame of a scene. As explained previously, in some embodiments, proximity of an object to the image-capturing device may be calculated during a post-processing step.

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, image-capturing device 112 may include fewer, additional, and/or different components than the exemplary external components depicted in FIG. 4. For example, in other implementations, camera 470 may be a film camera. Additionally, or alternatively, depending on image-capturing device 112, flash 474 may be a portable flashgun. Additionally, or alternatively, image-capturing device 112 may be a single-lens reflex camera. In still other implementations, one or more external components of image-capturing device 112 may be arranged differently.

Referring now to FIG. 5, FIG. 5 is a diagram illustrating internal components of the exemplary image-capturing device. As illustrated, image-capturing device 112 may include microphone 310, speaker 320, keypad 330, function keys 340, display 350, camera button 360, camera 470, a memory 500, a transceiver 520, and a control unit 530.

Memory 500 may include any type of storing component to store data and instructions related to the operation and use of image-capturing device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes illustrated in FIG. 2. However, the functions are not limited to those illustrated in FIG. 2. The code component 510 may work in conjunction with one or more other hardware or software components associated with the image-capturing device 112 to initiate and/or execute the processes illustrated in FIG. 2 or other processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of image-capturing device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of image-capturing device 112, and/or from a source external to image-capturing device 112 (e.g., a network or another device).

Control unit 530 may provide for different operational modes associated with image-capturing device 112. Additionally, control unit 530 may operate in multiple modes simultaneously. For example, control unit 530 may operate in a camera mode, a walkman mode, and/or a telephone mode. For example, when in camera mode, face-detection and tracking logic may enable image-capturing device 112 to detect and track multiple objects (e.g., the presence and position of each object's face) within an image to be captured. The face-detection and tracking capability of image-capturing device 112 will be described in greater detail below.

Although FIG. 5 illustrates exemplary internal components, in other implementations, image-capturing device 112 may include fewer, additional, and/or different components than the exemplary internal components depicted in FIG. 5. For example, in one implementation, image-capturing device 112 may not include transceiver 520. In still other implementations, one or more internal components of image-capturing device 112 may include the capabilities of one or more other components of image-capturing device 112. For example, transceiver 520 and/or control unit 530 may include their own on-board memory.

Referring now to FIG. 6, FIG. 6 is a diagram illustrating components of the exemplary camera depicted in FIG. 5. FIG. 6 illustrates lens assembly 472, proximity sensor 476, an iris/diaphragm assembly 616, a shutter assembly 618, a zoom lens assembly 620, an image sensor 622, and a luminance sensor 624.

Iris/diaphragm assembly 616 may include any component providing an aperture. Iris/diaphragm assembly 616 may be a thin, opaque, plastic structure with one or more apertures. This iris/diaphragm assembly 616 may reside in a light path of lens assembly 472. Iris/diaphragm assembly 616 may include different size apertures. In such instances, iris/diaphragm assembly 616 may be adjusted, either manually or automatically, to provide a different size aperture. In other implementations, iris/diaphragm assembly 616 may provide only a single size aperture.

Shutter assembly 618 may include any component for regulating a period of time for light to pass through iris/diaphragm assembly 616. Shutter assembly 618 may include one or more shutters (e.g., a leaf or a blade). The leaf or blade may be made of, for example, a metal or a plastic. In one implementation, multiple leaves or blades may rotate about pins so as to overlap and form a circular pattern. In one implementation, shutter assembly 618 may reside within lens assembly 472 (e.g., a central shutter). In other implementations, shutter assembly 618 may reside in close proximity to image sensor 622 (e.g., a focal plane shutter). Shutter assembly 618 may include a timing mechanism to control a shutter speed. The shutter speed may be manually or automatically adjusted.

Zoom lens assembly 620 may include lens elements to provide magnification and focus of an image based on the relative position of the lens elements. Zoom lens assembly 620 may include fixed and/or movable lens elements. In one implementation, a movement of lens elements of zoom lens assembly 620 may be controlled by a servo mechanism that operates in cooperation with control unit 530.

Image sensor 622 may include any component to capture light. For example, image sensor 622 may be a charge-coupled device (CCD) sensor (e.g., a linear CCD image sensor, an interline CCD image sensor, a full-frame CCD image sensor, or a frame transfer CCD image sensor) or a Complementary Metal Oxide Semiconductor (CMOS) sensor. Image sensor 622 may include a grid of photo-sites corresponding to pixels to record light. A color filter array (CFA) (e.g., a Bayer color filter array) may be on image sensor 622. In other implementations, image sensor 622 may not include a color filter array. The size of image sensor 622 and the number and size of each pixel may vary depending on image-capturing device 112. Image sensor 622 and/or control unit 530 may perform various image processing, such as color aliasing and filtering, edge detection, noise reduction, analog to digital conversion, interpolation, compression, white point correction, etc.

Luminance sensor 624 may include any component to sense the intensity of light (i.e., luminance). Luminance sensor 624 may provide luminance information to control unit 530 so as to determine whether to activate flash 474. For example, luminance sensor 624 may include an optical sensor integrated circuit (IC).

Although FIG. 6 illustrates exemplary components, in other implementations, image-capturing device 112 may include fewer, additional, and/or different components than the exemplary components depicted in FIG. 6. For example, when image-capturing device 112 is a film camera, image sensor 622 may be film. Additionally, it is to be understood that variations may exist among different devices as to the arrangement, placement, number, adjustability, shape, material, etc., relating to the exemplary components described above. In still other implementations, one or more exemplary components of image-capturing device 112 may include the capabilities of one or more other components of image-capturing device 112. For example, lens assembly 472 may include zoom lens assembly 620.

Referring now to FIGS. 7 and 8, FIGS. 7 and 8 are diagrams illustrating a front and rear view of external components of another exemplary image-capturing device. In this implementation, image-capturing device 112 may take the form of a camera, with or without additional communication functionality, such as the ability to make or receive telephone calls or connect to a data network. As illustrated, image-capturing device 112 may include a camera button 702, a lens assembly 704, a proximity sensor 706, a flash 708, a housing 710, and a viewfinder 712. Camera button 702, lens assembly 704, proximity sensor 706, flash 708, housing 710 and viewfinder 712 may include components that are similar to camera button 360, lens assembly 472, proximity sensor 476, flash 474, housing 305 and display 350 of image-capturing device 112, and may operate similarly. Although not illustrated, image-capturing device 112 may also include components that have been described with reference to FIGS. 5 and 6.

As used herein, the term “automatic” refers to a function, a process, a method, or any part thereof, which is executed by computer software upon occurrence of an event or a condition without intervention by a user.

In accordance with embodiments of the invention, the term “module” with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, “at least one” shall mean “one or more” and these phrases are intended to be interchangeable. Accordingly, the terms “a” and/or “an” shall mean “at least one” or “one or more,” even though the phrase “one or more” is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a “system.” Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for providing focus control, the method comprising:

capturing an image frame using an image-capturing device;

recording video tracking data for at least one image frame prior to the captured image frame and following the captured image frame;

recording gaze tracking data for the at least one image frame prior to the captured image frame and following the captured image frame, wherein the recording video tracking data step further comprises determining at least one moving object based at least partially on the recorded video tracking data, wherein the recording gaze tracking data step further comprises determining movement of at least one focus area based at least partially on the recorded gaze data;

correlating the at least one moving object with the movement of the at least one focus area;

determining, based at least partially on the correlating step, at least one object the image-capturing device is focusing on;

determining whether the image-capturing device focuses on a single object during a time frame that comprises the captured image frame and the at least one image frame following the captured image frame;

in response to determining the image-capturing device focuses on a single object during the time frame, calculating a focus distance and a depth of field associated with the single object based at least partially on at least one of (i) the recorded video tracking data for the at least one image frame prior to the captured image frame, (ii) the recorded video tracking data for the at least one image frame following the captured image frame, (iii) the recorded gaze tracking data for the at least one image frame prior to the captured image frame, or (iv) the recorded gaze tracking data for the at least one image frame following the captured image frame; and displaying the captured image frame based at least partially on the calculated focus distance and the calculated depth of field.

2. The method of claim 1, wherein the recording video tracking data step further comprises determining a distance from the image-capturing device to the at least one moving object in the captured image frame.

3. The method of claim 2, wherein the distance to the at least one moving object in the captured image frame is determined at a time after the capturing step.

4. The method of claim 1, further comprising:

determining whether the image-capturing device shifts focus from a first object to a second object during a time frame that comprises the captured image frame and the at least one image frame following the captured image frame; and in response to determining the image-capturing device shifts focus from the first object to the second object, initiating transition from a first focus setting and a first depth of field setting associated with the first object to a second focus setting and a second depth of field setting associated with the second object.

5. The method of claim 1, wherein the image-capturing device is a lightfield image-capturing device.

6. The method of claim 1, wherein the captured image frame and the at least one image frame following the captured image frame comprise a video.

7. The method of claim 1, wherein the image-capturing device is a stereoscopic image capturing device.

8. The method of claim 1, further comprising:

allowing a user to manually adjust the calculated focus distance and the calculated depth of field either using the image-capturing device or using a separate computing device.

9. The method of claim 1, further comprising recording video tracking data and gaze tracking data for the image frame while simultaneously capturing the image frame.

10. The method of claim 1, further comprising:

enabling the image-capturing device to predict an object's movement following the captured image frame based at least partially on the video tracking data recorded after the captured image frame, wherein the object is positioned in the captured image frame.

11. The method of claim 1, further comprising:

determining whether a movement of the image-capturing device is an initiation of a change in focus of the image-capturing device or is a temporary movement of the image-capturing device based at least partially on the gaze tracking data recorded after the captured image frame; and in response to determining the movement of the image-capturing device is an initiation of a change in focus of the image-capturing device, initiating a change in focus of the image-capturing device.

12. The method of claim 11, further comprising:

in response to determining the movement of the image-capturing device is a temporary movement, retaining a current focus of the image-capturing device.

13. The method of claim 1, wherein the image-capturing device determines a number of the at least one image frame that follows the captured image frame based at least partially on at least one of previously recorded video tracking data or previously recorded gaze tracking data.

14. A system for providing focus control, the system comprising:

an image-capturing component to capture an image frame;

a processor to initiate:

recording of video tracking data for at least one image frame prior to the captured image frame and following the captured image frame;

recording of gaze tracking data for the at least one image frame prior to the captured image frame and following the captured image frame, wherein the recording video tracking data step further comprises determining at least one moving object based at least partially on the recorded video tracking data, wherein the recording gaze tracking data step further comprises determining movement of at least one focus area based at least partially on the recorded gaze data;

correlate the at least one moving object with the movement of the at least one focus area;

determine, based at least partially on the correlating step, at least one object the image-capturing device is focusing on;

determine whether the image-capturing device focuses on a single object during a time frame that comprises the captured image frame and the at least one image frame following the captured image frame;

in response to determining the image-capturing device focuses on a single object during the time frame, calculate a focus distance and a depth of field associated with the single object based at least partially on at least one of (i) the recorded video tracking data for the at least one image frame prior to the captured image frame, (ii) the recorded video tracking data for the at least one image frame following the captured image frame, (iii) the recorded gaze tracking data for the at least one image frame prior to the captured image frame, or (iv) the recorded gaze tracking data for the at least one image frame following the captured image frame; and displaying the captured image frame based at least partially on the calculated focus distance and the calculated depth of field.

15. A method for providing focus control, the method comprising:

capturing an image frame using an image-capturing device;

recording video tracking data for at least one image frame following the captured image frame;

recording gaze tracking data for the at least one image frame following the captured image frame;

calculating a focus distance and a depth of field based at least partially on the recorded video tracking data and the recorded gaze tracking data;

displaying the captured image frame based at least partially on the calculated focus distance and the calculated depth of field;

determining whether a movement of the image-capturing device is an initiation of a change in focus of the image-capturing device or is a temporary movement of the image-capturing device based at least partially on the gaze tracking data recorded after the captured image frame; and in response to determining the movement of the image-capturing device is an initiation of a change in focus of the image-capturing device, initiating a change in focus of the image-capturing device.

16. The method of claim 15, further comprising:

in response to determining the movement of the image-capturing device is a temporary movement, retaining a current focus of the image-capturing device.

17. A method for providing focus control, the method comprising:

capturing an image frame using an image-capturing device;

recording video tracking data for at least one image frame following the captured image frame;

recording gaze tracking data for the at least one image frame following the captured image frame;

calculating a focus distance and a depth of field based at least partially on the recorded video tracking data and the recorded gaze tracking data;

displaying the captured image frame based at least partially on the calculated focus distance and the calculated depth of field, wherein the recording video tracking data step further comprises determining at least one moving object based at least partially on the recorded video tracking data, wherein the recording gaze tracking data step further comprises determining movement of at least one focus area based at least partially on the recorded gaze data;

correlating the at least one moving object with the movement of the at least one focus area;

determining, based at least partially on the correlating step, at least one object the image-capturing device is focusing on;

determining whether the image-capturing device focuses on a single object during a time frame that comprises the captured image frame and the at least one image frame following the captured image frame; and in response to determining the image-capturing device focuses on a single object during the time frame, calculating a focus distance and a depth of field associated with the single object.

18. A method for providing focus control, the method comprising:

capturing an image frame using an image-capturing device;

recording video tracking data for at least one image frame following the captured image frame;

recording gaze tracking data for the at least one image frame following the captured image frame;

calculating a focus distance and a depth of field based at least partially on the recorded video tracking data and the recorded gaze tracking data;

displaying the captured image frame based at least partially on the calculated focus distance and the calculated depth of field, wherein the recording video tracking data step further comprises determining at least one moving object based at least partially on the recorded video tracking data, wherein the recording gaze tracking data step further comprises determining movement of at least one focus area based at least partially on the recorded gaze data;

correlating the at least one moving object with the movement of the at least one focus area;

determining, based at least partially on the correlating step, at least one object the image-capturing device is focusing on;

determining whether the image-capturing device shifts focus from a first object to a second object during a time frame that comprises the captured image frame and the at least one image frame following the captured image frame; and in response to determining the image-capturing device shifts focus from the first object to the second object, initiating transition from a first focus setting and a first depth of field setting associated with the first object to a second focus setting and a second depth of field setting associated with the second object.

* * * * *